United States Patent [19]

Miller et al.

[11] Patent Number: 5,064,607
[45] Date of Patent: Nov. 12, 1991

[54] HYBRID NUCLEAR REACTOR GREY ROD TO OBTAIN REQUIRED REACTIVITY WORTH

[75] Inventors: John V. Miller, Munhall; William R. Carlson, Scott Township, Allegheny County; Michael B. Yarbrough, Hempfield Township, Westmoreland County, all of Pa.

[73] Assignee: Westinghouse Electric Corp., Pittsburgh, Pa.

[21] Appl. No.: 377,492

[22] Filed: Jul. 10, 1989

[51] Int. Cl.⁵ .................. G21C 7/103; G21C 7/117
[52] U.S. Cl. .................................................. 376/333
[58] Field of Search ............................ 376/327, 333

[56] References Cited

U.S. PATENT DOCUMENTS

| | | | |
|---|---|---|---|
| 3,230,147 | 1/1966 | Hitchcock | 376/333 |
| 3,255,086 | 6/1966 | Hitchcock | 376/333 |
| 3,485,717 | 12/1969 | Eich | 376/333 |
| 4,172,762 | 10/1979 | Anthony et al. | 376/327 |
| 4,326,919 | 4/1982 | Hill | 376/267 |
| 4,624,827 | 11/1986 | Doshi et al. | 376/333 |
| 4,642,216 | 2/1987 | Orr et al. | 376/327 |
| 4,678,628 | 7/1987 | Freeman | 376/333 |
| 4,681,728 | 7/1987 | Veronesi et al. | 376/209 |
| 4,707,324 | 11/1987 | Storrick | 376/215 |
| 4,707,329 | 11/1987 | Freeman | 376/449 |
| 4,716,007 | 12/1987 | Carlson et al. | 376/327 |

FOREIGN PATENT DOCUMENTS

| | | |
|---|---|---|
| 175455 | 3/1986 | European Pat. Off. . |
| 236114 | 9/1987 | European Pat. Off. . |
| 51-37396 | 3/1976 | Japan .................. 376/333 |
| 865226 | 1/1958 | United Kingdom . |
| 1056950 | 2/1967 | United Kingdom .................. 376/339 |

OTHER PUBLICATIONS

Reactor Handbook, Second Edition, C. R. Tipton, Jr., Battelle Memorial Institute, Jun. 1970, pp. 777-789.
Power Reactor Technology, vol. 4, No. 4, Sept. 1961, Control-Rod Materials, pp. 39-46.
European Search Report dated Sep. 20, 1990.
Revue Generale Nucleaire Article dated Jul./Aug. 1983 (in English and French).

*Primary Examiner*—Stephen C. Bentley
*Attorney, Agent, or Firm*—Z. L. Dermer

[57] ABSTRACT

Hybrid nuclear reactor grey rods are described, wherein geometric combinations of relatively weak neutron absorber materials such as stainless steel, zirconium or INCONEL, and relatively strong neutron absorber materials, such as hafnium, silver-indium cadmium and boron carbide, are used to obtain the reactivity worths required to reach zero boron change load follow. One embodiment includes a grey rod which has combinations of weak and strong neutron absorber pellets in a stainless steel cladding. The respective pellets can be of differing heights. A second embodiment includes a grey rod with a relatively thick stainless steel cladding receiving relatively strong neutron absorber pellets only. A third embodiment includes annular relatively weak netron absorber pellets with a smaller diameter pellet of relatively strong absorber material contained within the aperture of each relatively weak absorber pellet. The fourth embodiment includes pellets made of a homogeneous alloy of hafnium and a relatively weak absorber material, with the percentage of hafnium chosen to obtain the desired reactivity worth.

6 Claims, 4 Drawing Sheets

HYBRID NUCLEAR REACTOR GREY ROD TO OBTAIN REQUIRED REACTIVITY WORTH

The invention subject matter disclosed in this patent application was developed under Government Contract DE-AC03-86SF16038.

BACKGROUND OF THE INVENTION

1. Field of the Invention

The present invention relates generally to nuclear reactors and, more particularly, to grey rods having a required reactivity worth for reactivity control of the reactor, such as during and following a period of lower power demand.

2. Description of the Prior Art

In a typical nuclear reactor, such as a pressurized water reactor (hereinafter PWR), the reactor core includes a large number of fuel assemblies. Each fuel assembly is composed of a plurality of elongated fuel rods transversely spaced apart from one another. The fuel rods, each containing fissile material, generate a neutron flux in the core sufficient to support a high rate of nuclear fission and thus the release of a large amount of energy in the form of heat. A liquid coolant (usually water) is pumped upwardly through the core in order to extract some of the heat generated in the core for the production of useful work.

One type of PWR fuel assembly, to which the present invention is particularly suited, is known as a "$17 \times 17$" fuel assembly design. In this type of design, the fuel assembly includes a square lattice with 17 fuel rods along each side. This fuel assembly has 264 fuel rods, 24 guide thimbles (for control rods or grey rods discussed below) and one instrument thimble. The outer diameters of the rods are usually on the order of 0.4". See, e.g., co-assigned U.S. Pat. NO. 4,642,216, issued to ORR et al. (hereinafter the "'216 patent") for a further discussion of this type of fuel assembly.

Since the rate of heat generation in the reactor core is proportional to the nuclear fission rate, which, in turn, is determined by the neutron flux in the core, control of heat generation at reactor startup, during its operation and at shutdown is achieved by varying the neutron flux. Generally, this has been done by absorbing excess neutrons using clusters of control rods in combination with a soluble neutron absorber. Initially, the level of neutron flux and thus the heat output of the core is regulated by the movement of the control rods into and from the guide thimbles.

The ability of a control rod to absorb neutrons is measured by its relative "reactivity worth." The reactivity worth of a rod can be determined by calculations well known in the art. The basis for calculating the relative value of total and individual rod worths can be an all uranium core or an assumed mixed oxide and uranium core having uranium fuel rods.

Hafnium, silver-indium cadmium, boron carbide, and other materials are known to be strong absorbing or high worth materials. These materials are also termed black absorbers because they are relatively opaque to neutrons. In contrast, stainless steel, zirconium, INCONEL (The trademark for a nickel-based alloy containing 16% chromium and 7% iron and characterized by marked resistance to aqueous corrosion and by high temperature oxidation resistance; also known as Alloy 600) and other materials are known as weak, have relatively low worths and are generally referred to as grey absorbers.

Knowledge of individual rod and rod cluster reactivity worths is of vital importance in controlling the core, as well as determining necessary concentrations of soluble neutron absorbers and additionally in providing fluid moderator, flow rate, density and composition requirements for the reactor.

One common structure adapted for control rods is described in co-assigned U.S. Pat. No. 4,326,919, issued to HILL. This control rod is in the form of an elongated metallic cladding tube having a strong neutron absorbing material disposed within the tube and plugs at opposite ends thereof for sealing the absorber material within the tube. The neutron absorbing material is in the form of a stack of closely packed, high worth ceramic or metallic annular pellets which only partially fill the tube, leaving a void, space or axial gap between the top of the pellets and the upper end plug in defining a plenum chamber for receiving gases which are generated during the control operation. Pellets are used instead of a solid rod to increase the flexibility of the rods and minimize drag during withdrawal and insertion.

Control rods affect reactivity by changing direct neutron absorption and are used for what is known as fast reactivity control. On the other hand, slower, longer term reactivity control is usually carried out by the soluble neutron absorbers and by grey rods which are of low worth relative to the control rods. Grey rods have structures almost identical to the control rods described above, except for the cladding filler. See, e.g., co-assigned U.S. Pat. No. 4,681,728, issued to VERONESI et al. Typically, grey rods have a relatively weak absorber material cladding, e.g. stainless steel, and a relatively weak absorber material cladding filler, e.g. zirconium pellets.

More particularly, the soluble neutron absorbers, such as boric acid, are uniformly distributed in solution throughout the core coolant, leading to more uniform power distribution and fuel depletion than control rods. The concentration of soluble boron is normally decreased with core age to compensate for fuel depletion and fission product buildup.

The buildup of fission products, such as Xenon-135 (hereinafter xenon), reduces reactivity by parasitically absorbing neutrons, thereby decreasing thermal utilization. The xenon is removed by neutron absorption or by decay. Upon a reduction in core power, such as during "load follow maneuvers," fewer thermal neutrons are available to remove the xenon and therefore the concentration of xenon in the core increases. Load follow maneuvers refers to any reactor power changes which are required because of changes in electrical demand. A typical maneuver is a daily load follow, in which the reactor is reduced to a low power value (normally 50 percent) for 6 or 8 hours during the night when electrical demand is at a minimum.

The increase in xenon concentration is usually compensated for by either decreasing the concentration of soluble boron dissolved in the core coolant or by withdrawing the control rods from the core. However, both of these methods have drawbacks. Changing the boron concentration requires the processing of coolant which is difficult and expensive, and therefore not desired by the electrical utility, especially towards the end of core life. Removal of control rods means that the core's return to power capability is reduced. A potential solution to this problem is to use the low worth grey rods in the core at full power. These grey rods are available for removal at reduced power to compensate for the xenon buildup.

As described in co-assigned U.S. Pat. No. 4,707,329, issued to FREEMAN, the drawback of this procedure is that moving these banks of grey rods changes the ever critical axial offset of the core and increases peaking factors. Also, because these low worth grey rod banks are in the core at power, shutdown margins can be affected. This patent suggests as a solution using, instead of grey rods, the full insertion into the core of a control rod whose worth can be changed uniformly in the axial direction during power operation to provide xenon compensation. The control rod is composed of an elongated inner cylindrical member and an elongated outer cylindrical member surrounding the inner member. Each of the elongated members is composed of alternating equal height high worth hafnium and low worth zirconium regions. The inner and outer members are axially movable relative to each other to adjust the degree to which the high and low worth regions of the respective members overlap and thereby change the overall worth of the rod.

This patented control rod approach, however, is complicated due to requiring an elaborate mechanical, moving structure which is difficult to construct and operate, is relatively expensive, and may fail to fully compensate for the buildup of fission products.

The above-cited '216 patent describes a type of grey rod for use with a 17×17 fuel assembly, wherein 12 of the 24 strong absorber rods are replaced by 12 stainless steel rods to improve core operations. The disadvantage with this grey rod design is that the combination of strong absorber rods and weak (low worth) rods in the same cluster do not provide for homogeneous absorptions and can result in power peaking penalties.

Further, it is known that the use of low worth grey rods can reduce the coolant processing requirements for a reactor from many thousands of gallons per day to relatively insignificant amounts. A related, important goal is to operate in what is known as a zero boron change load follow (hereinafter ZBCLF) mode, which requires no soluble boron adjustments during load follow maneuvers. Unfortunately, conventional, low worth grey rods are incapable of allowing ZBCLF at all power conditions because their cumulative worth is deficient.

One potential modification to the grey rods to increase their relative worths, at least when the diameter of the grey rods is rather large, e.g., 0.8 to 1.0" O.D., is to vary the size of the central hole in the annular pellets. That is, by decreasing the size of the hole, it is possible to increase the volume fraction of absorber material, thus increasing the reactivity worth. As a result, the number of grey rods in a typical design might actually be reduced from the normal compliment because of the increased reactivity worth.

Reducing the number of grey rods is desired for two reasons: first, it simplifies the mechanical design of the upper internals and reactor vessel head/integrated heat package; and second, there is a significant reduction in capital cost due to elimination of some of the assembly, driveline mechanism, cabling, etc., costs associated with use of the larger number of rods.

However, this alternative is not adaptable for all fuel assemblies. For example, it is not applicable to a standard 17×17 reactor, because the outer diameters of the rods used therein are too small (about 0.381 inch). In fact, even with approximately 100% volume fraction of stainless steel or INCONEL (i.e., 0.341 inch pellets inside a 0.381 inch O.D./0.344 inch I.D. cladding) the reactivity worth of the individual grey rods in a particular application would probably be insufficient to achieve ZBCLF: additional grey rods of the same (stainless or INCONEL) design would probably be required. However, the addition of more grey rods would increase the mechanical complexity of the reactor vessel internals/head area/integrated head package/etc. and would significantly increase the capital cost.

Notwithstanding a theoretical desire to reach ZBCLF by increasing grey rod worth, a designer must be able to retain the desired stiffness criteria for grey rods, as well as prevent the weight of the grey rods from increasing, which would increase driveline mechanism requirements.

Thus, merely increasing significantly the cladding thickness to increase worth would not only undesirably increase stiffness, but would also be difficult and expensive to manufacture.

Moreover, using a solid grey rod of a relatively weak neutron absorber material would be less expensive than the thick walled tube suggested immediately above, but would further frustrate the stiffness criterion. A solid rod would also violate the weight criterion unless the O.D. of the rod were reduced. However, using a small rod might lead to vibration and wear problems in both the core thimbles and in the upper guide structures since these components were designed to accommodate rods of a certain outer diameter. In light of the above, a grey rod design which has the required worth to achieve ZBCLF, is adaptable to a "17×17" fuel assembly, is economically manufactured, and can be incorporated without complication of the remaining reactor structure or operation, is still desired.

SUMMARY OF THE INVENTION

Accordingly, it is a purpose of the present invention to provide a reactivity control means for a nuclear reactor which reduces construction, maintenance, fuel and operating costs.

It is another purpose of the present invention to provide a grey rod design having a worth intermediate that of a relatively high worth conventional control rod and a relatively lower worth conventional grey rod.

It is another purpose of the present invention to provide a grey rod design eliminating the need for a cyclical boron change during load follow operation.

It is another purpose of the present invention to provide a grey rod design for controlling reactivity without impacting power distribution.

It is another purpose of the present invention to provide a grey rod design which allows fewer grey rods to be used to absorb excess neutrons during operation of the nuclear reactor.

It is another purpose of the present invention to provide a grey rod design which does not violate the stiffness and weight parameters currently observed for grey rods.

Finally, it is a purpose of the present invention to provide a hybrid grey rod whose reactivity worth can be chosen to most efficiently absorb excess neutrons.

To achieve the foregoing and other purposes of the present invention there is provided several hybrid grey rod designs, wherein geometric combinations of relatively strong and weak absorber materials are used to obtain various required reactivity worths. A first embodiment of the invention includes a grey rod having combinations of weak absorber material pellets, such as stainless steel or INCONEL, and strong absorber material pellets, such as hafnium, selected to obtain the required worth. The pellets can be of varying heights and are housed in a stainless steel cladding of a first thickness. A second embodiment includes a rod with relatively small diameter hafnium or other strong absorber material pellets received in a stainless steel or INCONEL cladding of a second, relatively greater thickness. A third embodiment includes annular stainless steel or INCONEL pellets, each with a smaller diameter hafnium or other strong absorber material pellet contained within the central hole of each stainless steel or INCONEL pellet, or a continuous hafnium or other strong absorber material wire received by the central holes of the stainless steel or INCONEL pellets. The cladding is again of stainless steel or INCONEL having the first thickness. A fourth embodiment includes pellets made of zirconium and hafnium as a homogeneous mixture, with the percentage of hafnium adjusted to obtain the desired reactivity worth. The cladding is again of stainless steel or INCONEL having the first thickness. Benefits of the present invention include a greater operating flexibility and reduction in the total number of grey rods required to achieve ZBCLF in certain applications.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments according to the present invention will now be described with reference to the Figures. In this description certain dimensions are indicated, but it is to be understood that these dimensions are merely illustrative to enable a person of ordinary skill in this field to make and use the invention. The dimensions indicated, however, are not intended to limit the invention.

Figure 1:
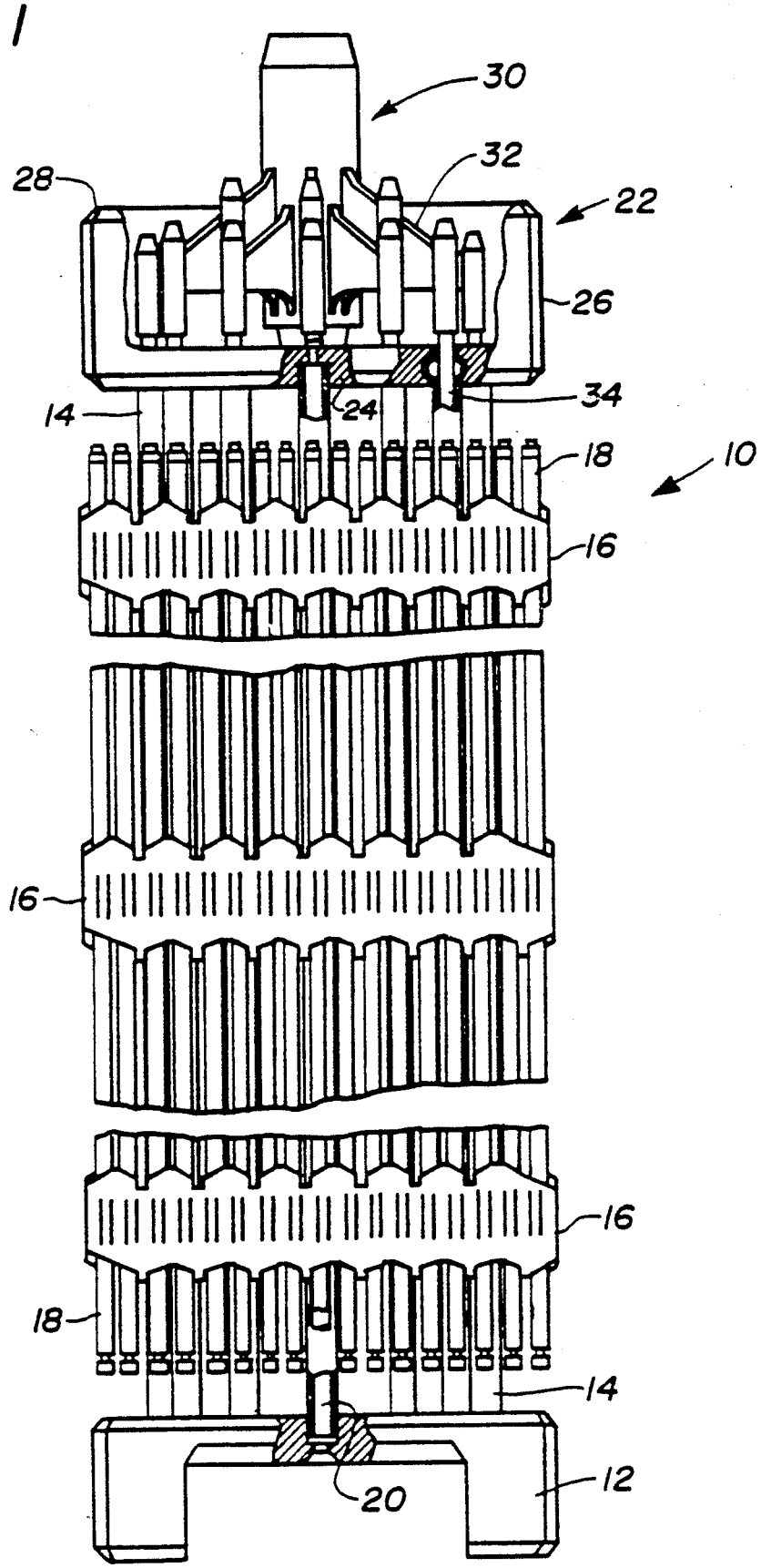
FIG. 1 is a partially sectioned, elevational view of a conventional "17×17" nuclear fuel assembly, being shown in vertical foreshortened form and with parts broken away for clarity, having a spider assembly disposed above the fuel assembly and supporting a plurality of grey rods extending down through the guide thimbles of the fuel assembly, the rods being formed in accordance with the principles of the present invention.

Referring to FIG. 1, there is shown an elevational view of a conventional "17×17" PWR fuel assembly, represented in vertically foreshortened form and being generally designated by the numeral 10. As suggested above, the present invention is particularly suited for such a "17×17" fuel assembly wherein the rod outer diameters are about 0.4". However, the present invention is also applicable to other than a 17×17 fuel assembly, but may provide lesser benefits (or may not be required) for designs which utilize large diameter control/grey rods (i.e., diameters of 0.8 to 1.0 inch).

Fuel assembly 10 basically includes: a bottom nozzle 12 for supporting the assembly 10 on a lower plate (not shown) in the core region of a reactor (not shown); a number of longitudinally extending guide thimbles 14 projecting upwardly from the bottom nozzle 12; a plurality of transverse grids 16 axially spaced along the guide thimbles 14; an organized array of elongated fuel rods 18 transversely spaced and supported by the grids 16; an instrumentation tube 20 located in the center of the assembly 10; and a top nozzle 22, attached to the upper ends of the guide thimbles 14, to form an integral assembly 10 capable of being conventionally handled without damaging the assembly components.

The top nozzle 22 includes a transversely extending adapter plate 24 having upstanding sidewalls 26 (the front wall being partially broken away) secured to the peripheral edges thereof to define an enclosure or housing. An annular flange 28 is secured to the top of the sidewalls 26.

Figure 2:
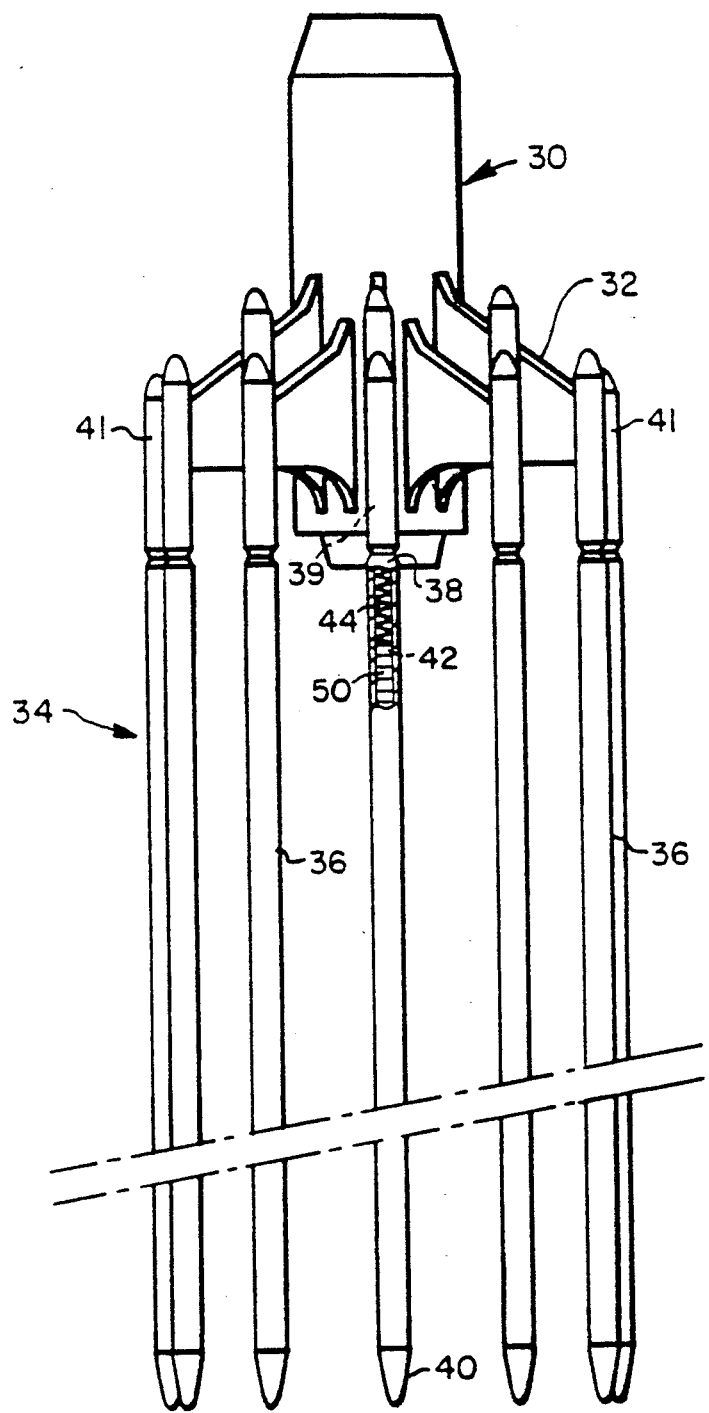
FIG. 2 is an elevational view of the spider assembly and attached grey rods, removed from the fuel assembly seen in FIG. 1.

As shown in FIGS. 1 and 2, disposed within the opening defined by the annular flange 28 of top nozzle 22 is a spider assembly 30, having radially extending flukes 32 connected to the upper ends of grey rods 34 which are adapted to be inserted down through the guide thimbles 14 of the fuel assembly 10. The spider assembly 30 is connected to a control/drive mechanism (not shown) which is operable in a well known manner to move the rods 34 in and out of the guide thimbles 14.

As best seen in FIG. 2, each grey rod 34 includes an elongated, metallic tube or cladding 36. Preferably, the cladding 36 is stainless steel or INCONEL having an outer generally constant diameter. The grey rod 34 also includes means in the form of respective upper and lower end plugs 38, 40 for closing or sealing the opposite ends of the cladding 36. The upper end plug 38 has an upwardly extending integrally formed stem section 39 with an externally threaded end for connection to the outward end 41 of the radial fluke 32 of the spider assembly 30. The lower end plug 40 is cone-shaped.

Slidably disposed within the cladding 36 and resting on the lower end plug 40 is a stack or plurality of closely packed pellets 50 (the specific arrangement and characteristics thereof will be described shortly hereafter) which only partially fill the cladding 36, leaving a space or axial gap between the top of the pellets 50 and the upper end plug 38 defining a plenum chamber 42 for receiving gases generated during use. A coil spring 44 is disposed within this plenum chamber 42 and held in a state of compression between the upper end plug 38 and the top pellet to thereby maintain the plurality of pellets 50 in their closely packed arrangement during use of the grey rod 34.

The inner diameter of the guide thimbles 14 is usually chosen to be the maximum permitted by the fuel assembly lattice in order that the maximum possible diameter grey rod 34 can be inserted therein. It is desirable to maximize the diameter of the plurality of pellets 50 in the grey 34 rod because the absorption effectiveness of the rods is very strongly dependent, particularly in thermal neutron reactors, on the surface area of the pellets 50. For this reason, and to promote heat transfer, there usually are narrow clearances between the pellets 50 and the cladding 36, and between the rod 34 and its guide thimble 14. The gap between the pellets 50 and the cladding 36 must be large enough, however, to accommodate any swelling which the pellets 50 may experience when they are irradiated while in the reactor core.

It is very important that the swollen pellets 50 not press too strongly against the cladding 36 inner wall because significant cladding deformation can result, causing the grey rod 34 to jam in its guide thimble 14. However, if the gap is too large, chips that are dislodged from the pellets 50 as a result of the grey rod 34 reciprocation will settle in the gap in the lower tip of the rod 34 and quickly deform the cladding 36 as the pellets near the lower end plug 40 swell.

The present inventors have found that ZBCLF is attainable by increasing the relative worths of each grey rod to a level approximately intermediate that of conventional grey rods and control rods. In order to achieve this goal, several criteria had to be satisfied in order to provide an efficient design:
(a) The grey rod worth is approximately 40-60% greater than the conventional grey rod in order to obtain ZBCLF.
(b) The stiffness of the grey rods is not significantly increased, if at all, over conventional grey rods.
(c) The weight of grey rod clusters are not greater than that of conventional clusters.

The stiffness requirement is based upon the desire to prevent additional drag forces which, as noted above, could be detrimental to stepping performance and could adversely effect the wear characteristics of the grey rod clusters. The weight restriction is also based upon the desire to limit stepping forces during grey rod clusters withdrawal and insertion.

The present invention uses hybrid grey rods to obtain the required reactivity worth for ZBCLF. These grey rods include combinations of a strong absorber material, such as hafnium, and a weak absorber material, such as stainless steel, INCONEL or zirconium, in proportions to achieve the desired reactivity worth. Since the worth of the strong absorber materials is significantly greater than that of e.g. stainless steel, INCONEL or zirconium, the volume fraction of hafnium or other strong absorber material required to increase the overall reactivity worth of the grey rods to the desired level is relatively small.

FIGS. 3-6 show alternate ways to vary the volumetric concentration of the strong absorber material within the present 0.381 inch O.D. of a 1733 17 configuration fuel assembly. Based upon the reactivity worth requirements, one can determine the volume fraction of hafnium or other strong absorber material required according to conventional analytical methods. One of the configurations shown in FIGS. 3-6 would then be selected based upon economic and manufacturing considerations.

Figure 3:
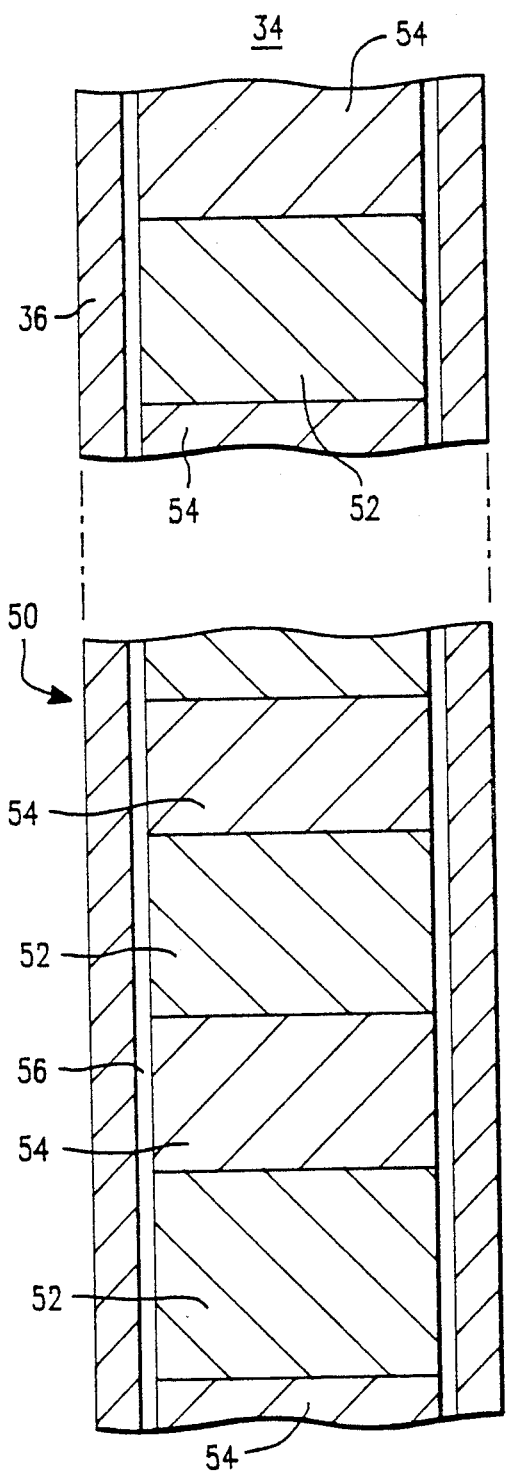
FIG. 3 is a side, partial cross-sectional view of a grey rod according to a first embodiment of the present invention.

FIG. 3 shows a first embodiment of the grey rod 34 according to the present invention. In this embodiment, the cladding 36 is, e.g. a stainless steel or INCONEL tube of about 0.344" I.D. and about 0.381" O.D. The plurality of pellets 50, includes a first group of weak absorber material (e.g. stainless steel or INCONEL) solid pellets 52, each of which is interposed between two strong absorber material (e.g., hafnium) solid pellets 54. The hafnium or other strong absorber material pellets 54 can be of shorter height than the stainless steel or INCONEL pellets 52 to obtain the worth desired. Alternatively, hollow or annular pellets could also be used in this embodiment to adjust the volume fraction of the absorber. A space 56 is longitudinally provided between the outer diameter of the plurality of pellets 50 and the inner diameter of the cladding 36.

Figure 4:
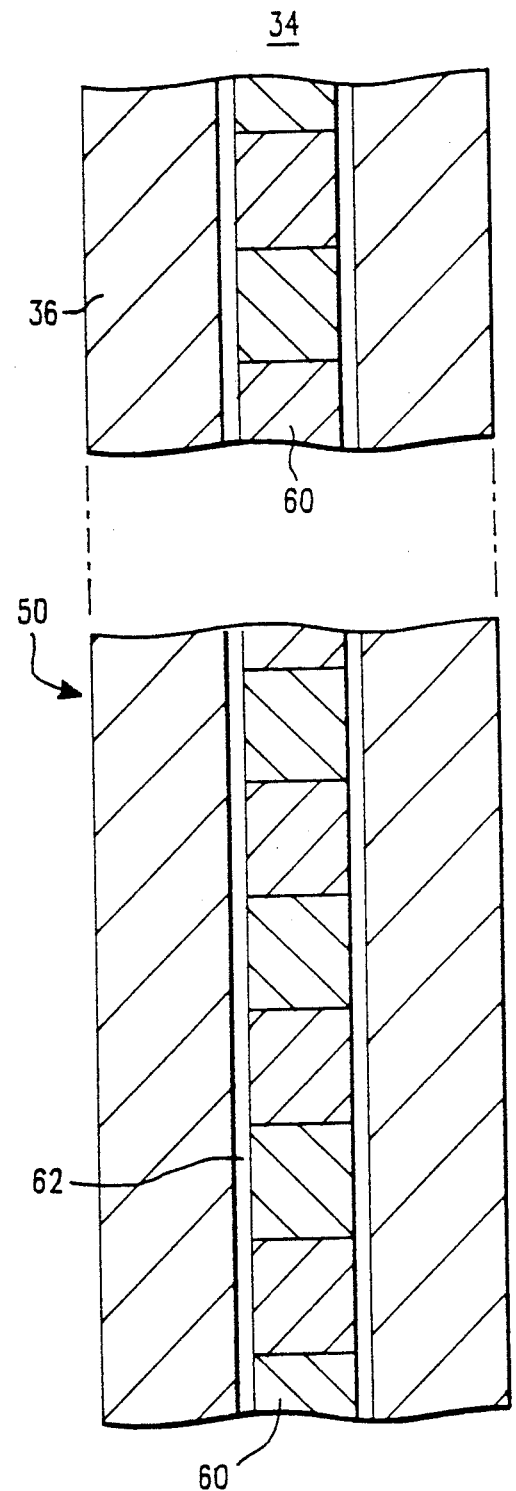
FIG. 4 is a side, partial cross-sectional view of a grey rod according to a second embodiment of the present invention

FIG. 4 illustrates a second embodiment including a relatively thick stainless steel cladding 36 of about 0.381" O.D. and approximately 0.26" I.D. The cladding I.D. is not necessarily a fixed value but could vary between 0.26 to 0.30 inch. The plurality of pellets 50 includes relatively small (approximately 0.25" O.D.), preferably solid hafnium or other strong absorber material pellets 60. Again, a longitudinal space 62 exists between the stack of pellets 50 and the I.D. of the cladding 36.

Figure 5:
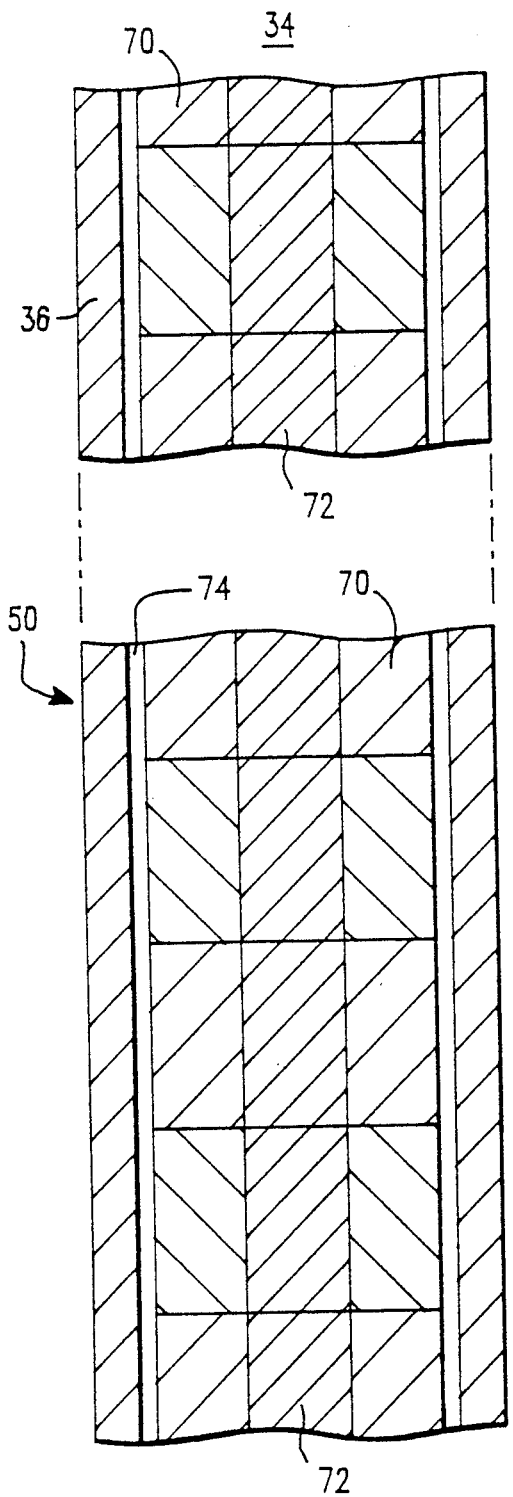
FIG. 5 is a side, partial cross-sectional view of a grey rod according to a third embodiment of the present invention.

FIG. 5 shows a third embodiment in which the plurality of pellets 50 includes a group of stainless steel or INCONEL pellets 70. Each pellet 70 is an annular or hollow pellet positioned inside the cladding 36. Each pellet 70 receives at the central hole thereof a relatively small diameter strong absorber material (such as hafnium) pellet 72. Alternatively, the holes of the group of pellets 72 could be filled by a continuous wire made of hafnium or another strong absorber material. The cladding 36 is again about 0.381" O.D., 0.344 I.D., as with the first embodiment, and a space 74 exists between the cladding 36 and the plurality of pellets 50.

Figure 6:
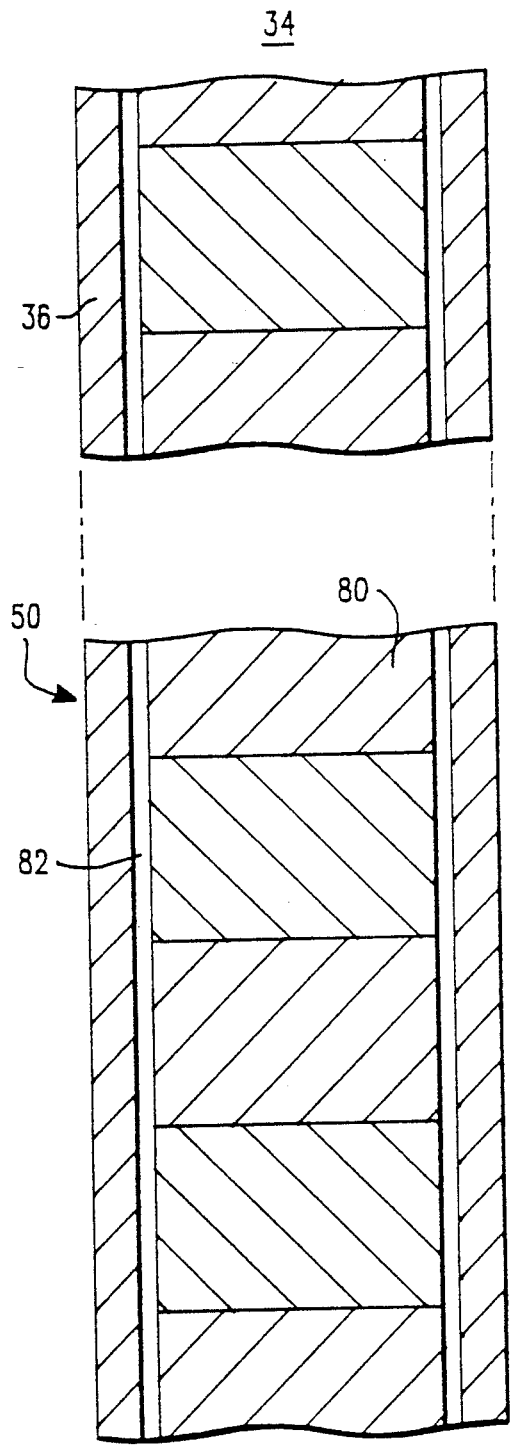
FIG. 6 is a side, partial cross-sectional view of a grey rod according to a fourth embodiment of the present invention.

FIG. 6 illustrates a fourth embodiment, wherein the plurality of pellets 50 includes a group of pellets 80 made up of a homogeneous alloy of a weak absorber material, such as zirconium, and a strong absorber material, such as hafnium. The parent metal is Zirconium ZIRCALOY (the trademark for an alloy composed mostly of zirconium with small amounts of various additives such as Tin, Iron, Chromium and Nickel for corrosion resistance. There are currently two basic ZIRCALOY alloys, Zirc-2 and Zirc-b 4, which differ to a minor extent in Nickel and Iron/Chromium content into which a small fraction of hafnium is blended. Hafnium is, in fact, a trace element of naturally occurring zirconium and can be readily combined with the zirconium in a vacuum melting process.

That is, materials such as ZIRCALOY and hafnium are susceptible to high temperature oxidation when exposed to air. In the vacuum melting process, all of the air is evacuated (pumped) from the melting chamber before the materials are heated, thus preventing oxidation. The process is widely used and well known in the materials field.

The percentage of hafnium is adjusted to obtain the desired reactivity worth of the grey rods 34. The nuclear designer would specify the desired mass fraction of hafnium required to obtain the reactivity worth and a small ingot of zirconium or ZIRCALOY with the desired concentration of hafnium would then be prepared. This ingot would then be formed into rods of proper diameter, cut into pellets 80 of the proper length, and centerless ground. That is, a rod is passed through a grinder with floating heads and a rod of a smaller diameter with very close tolerance is produced without the necessity of knowing the true center of the initial rod.

The pellets are then inserted into the stainless cladding 36. As in the case of the embodiment shown in FIG. 3 described above, hollow or annular pellets 80 could be used. Again, a space 82 exists between the plurality of pellets 50 and the cladding 36.

The method used by the nuclear designer would be the same regardless of which of the mechanical or alloy embodiments described above were used. More particularly, depending upon a particular application and the desired load follow strategy to be used, the nuclear designer would determine the number of grey rods needed and the reactivity worth requirement of each rod. The reactivity worth defined above would then be used to determine the relative amount of strong neutron absorber material required in each grey rod cluster assembly (i.e., 24 rods in a 17×17 fuel assembly).

The grey rod mechanical designer would then determine what size components would produce the desired volume fraction of the strong absorber material. For example, if the embodiment shown in FIG. 3 were used, the designer would determine the cladding thickness and pellet heights. Or, if the alloy embodiment shown in FIG. 6 were used, he would determine the volume fraction of hafnium which would be added to the zirconium to produce the desired worth.

More specifically, a grey rod cluster in a 17×17 fuel assembly (i.e, 24 rods) has a total volume of 394 cubic inches (i.e., $24 \times \pi \times 0.381^2 \times 144/4$). If the nuclear designer required 100 cubic inches of a strong absorber to achieve the desired grey rod worth, the grey rod mechanical designer would find the optimum configuration which would contain 294 cubic inches of stainless steel and 100 cubic inches of either hafnium, silver-indium cadmium, boron carbide or other strong absorber material.

As described above, according to the present invention, each grey rod 34 can have a particular worth by choosing a particular combination of a strong absorber material like hafnium and a weak absorber material like stainless steel or zirconium. In this way, the cluster of grey rods can include rods of the same or of varying worths, thereby providing a cluster of a particular worth.

Studies have indicated that, even with a reduced number of grey rods, about a 40–60 percent increase in individual grey rod worth is sufficient to achieve ZBCLF capability. It appears that 20 grey rod clusters, instead of the conventional 28, would be sufficient to obtain the desired load follow characteristics.

The elimination of eight control rod clusters and associated equipment results in a significant capital cost reduction. This includes the cost of the grey rod clusters, the drive rods, rod grinders, head penetrations and control rod drive mechanisms.

Further, the improvements in power distribution control strategy to accomplish ZBCLF described herein can be incorporated with no adverse impact on load follow behavior. Finally, these benefits are made possible without exceeding the stiffness and weight parameters currently followed for grey rods.

The foregoing is considered illustrative only of the principles of the invention. Further, since numerous modifications and changes Will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A grey rod for use in controlling reactivity of a fuel assembly in a nuclear reactor, comprising:
    (a) tubular, elongated, cladding selected from the weak neutron absorbing material group consisting of stainless steel, zirconium and INCONEL;
    (b) a first cladding insert including a first plurality of pellets selected from the strong, neutron absorbing material group consisting of hafnium, silver-indium-cadmium, and boron carbide; and
    (c) a second cladding insert including a second plurality of pellets selected from the weak neutron absorbing material group consisting of stainless steel, INCONEL, zirconium and ZIRCALOY,
    wherein said first and second inserts extend substantially along the length of the cladding, and
    wherein pellets from the respective pluralities alternate.

2. A grey rod for use in controlling reactivity of a fuel assembly in a nuclear reactor, comprising:
    (a) tubular, elongated, cladding selected from the weak neutron absorbing material group consisting of stainless steel, zirconium and INCONEL;
    (b) a first cladding insert including a first plurality of pellets selected from the strong, neutron absorbing material group consisting of hafnium, silver-indium-cadmium, and boron carbide; and
    (c) a second cladding insert including a second plurality of pellets selected from the weak neutron absorbing material group consisting of stainless steel, INCONEL, zirconium and ZIRCALOY,
    wherein said first and second inserts extend substantially along the length of the cladding, and
    wherein each of the pellets of the first cladding insert has a same height shorter than a same height of each of the pellets of the second cladding insert.

3. A control arrangement for use with a nuclear fuel assembly having a plurality of reactivity control rods and a plurality of guide thimbles, said arrangement providing supplemental reactivity control and allowing zero boron change load follow mode, comprising:
    (a) a spider assembly; and
    (b) a plurality of grey rods supported at their upper ends from said spider assembly and extending generally parallel to one another downwardly therefrom for insertion into the guide thimbles of the fuel assembly,
    wherein each grey rod includes
        (i) a tubular, elongated, cladding selected from the weak neutron absorbing material group consisting of stainless steel, zirconium and INCONEL,
        (ii) a first cladding insert including a first plurality of pellets selected from the strong neutron absorbing material group consisting of hafnium, silver-indium-cadmium, and boron carbide, and
        (iii) a second cladding insert including a plurality of pellets selected from the weak neutron absorbing material group consisting of stainless steel, INCONEL, zirconium and ZIRCALOY,
    wherein said first and second inserts extend substantially along the length of the cladding, and wherein each of the pellets of the first cladding insert has a same height shorter than a same height of each of the pellets of the second cladding insert.

4. The arrangement as recited in claim 3, wherein the fuel assembly is a 17×17 fuel assembly.

5. The arrangement as recited in claim 3, wherein the outer diameter of each grey rod is approximately 0.4 inch.

6. A control arrangement for use with a nuclear fuel assembly having a plurality of reactivity control rods and a plurality of guide thimbles, said arrangement providing supplemental reactivity control and allowing zero boron change load follow mode, comprising:

(a) a spider assembly; and
(b) a plurality of grey rods supported at their upper ends from said spider assembly and extending generally parallel to one another downwardly therefrom for insertion into the guide thimbles of the fuel assembly, wherein each grey rod includes
(i) a tubular, elongated, cladding selected from the weak neutron absorbing material group consisting of stainless steel, zirconium and INCONEL,
(ii) a first cladding insert including a first plurality of pellets selected from the strong neutron absorbing material group consisting of hafnium, silver-indium-cadmium, and boron carbide, and
(iii) a second cladding insert including a plurality of pellets selected from the weak neutron absorbing material group consisting of stainless steel, INCONEL, zirconium and ZIRCALOY, wherein said first and second inserts extend substantially along the length of the cladding, and wherein pellets from the respective pluralities alternate.

* * * * *